United States Patent
Ahmad (10) Patent No.: US 10,135,986 B1
(45) Date of Patent: Nov. 20, 2018

(54) TECHNIQUES FOR BEHAVIORAL PAIRING MODEL EVALUATION IN A CONTACT CENTER SYSTEM

(71) Applicant: Afiniti International Holdings, Ltd., Hamilton (BM)

(72) Inventor: Muhammad Haseeb Ahmad, Rawalpindi (PK)

(73) Assignee: Afiniti International Holdings, Ltd., Hamilton (BM)

( * ) Notice: Subject to any disclaimer, the term of this patent is extended or adjusted under 35 U.S.C. 154(b) by 0 days.

(21) Appl. No.: 15/438,325

(22) Filed: Feb. 21, 2017

(51) Int. Cl.
    *H04M 3/523* (2006.01)
(52) U.S. Cl.
    CPC .................. *H04M 3/5232* (2013.01)
(58) Field of Classification Search
    CPC .................................... H04M 3/5232
    USPC .................... 379/265.11; 705/7.13
    See application file for complete search history.

(56) References Cited

U.S. PATENT DOCUMENTS

| | | |
|---|---|---|
| 5,155,763 A | 10/1992 | Bigus et al. |
| 5,206,903 A | 4/1993 | Kohler et al. |
| 5,327,490 A | 7/1994 | Cave |
| 5,537,470 A | 7/1996 | Lee |
| 5,702,253 A | 12/1997 | Bryce et al. |
| 5,825,869 A | 10/1998 | Brooks et al. |
| 5,903,641 A | 5/1999 | Tonisson |
| 5,907,601 A | 5/1999 | David et al. |
| 5,926,538 A | 7/1999 | Deryugin et al. |
| 6,049,603 A | 4/2000 | Schwartz et al. |
| 6,052,460 A | 4/2000 | Fisher et al. |
| 6,064,731 A | 5/2000 | Flockhart et al. |
| 6,088,444 A | 7/2000 | Walker et al. |
| 6,163,607 A | 12/2000 | Bogart et al. |

(Continued)

FOREIGN PATENT DOCUMENTS

| | | |
|---|---|---|
| AU | 2008349500 C1 | 5/2014 |
| AU | 2009209317 B2 | 5/2014 |

(Continued)

OTHER PUBLICATIONS

Anonymous. (2006) "Performance Based Routing in Profit Call Centers," The Decision Makers' Direct, located at www.decisioncraft. com, Issue Jan. 6, 2012 (3 pages).

(Continued)

*Primary Examiner* — Quynh H Nguyen
(74) *Attorney, Agent, or Firm* — Wilmer Cutler Pickering Hale and Dorr LLP (57) ABSTRACT

Techniques for behavioral pairing model evaluation in a contact center system are disclosed. In one particular embodiment, the techniques may be realized as a method for behavioral pairing model evaluation in a contact center system and communicatively coupled to the operating system comprising determining, by at least one computer processor configured to operate in the contact center system, contact data; partitioning, by the at least one computer processor, the contact data into a first plurality of types; determining, by the at least one computer processor, a first measure of the quality of the partitioning of the contact data into the first plurality of types; and outputting, by the at least one computer processor, a computer-processor generated behavioral pairing model based on the quality of the partitioning.

18 Claims, 4 Drawing Sheets

(56) References Cited

U.S. PATENT DOCUMENTS

| | | |
|---|---|---|
| 6,222,919 B1 | 4/2001 | Hollatz et al. |
| 6,292,555 B1 | 9/2001 | Okamoto |
| 6,324,282 B1 | 11/2001 | McIllwaine et al. |
| 6,333,979 B1 | 12/2001 | Bondi et al. |
| 6,389,132 B1 | 5/2002 | Price |
| 6,389,400 B1 | 5/2002 | Bushey et al. |
| 6,408,066 B1 | 6/2002 | Andruska et al. |
| 6,411,687 B1 | 6/2002 | Bohacek et al. |
| 6,424,709 B1 | 7/2002 | Doyle et al. |
| 6,434,230 B1 | 8/2002 | Gabriel |
| 6,496,580 B1 | 12/2002 | Chack |
| 6,504,920 B1 | 1/2003 | Okon et al. |
| 6,519,335 B1 | 2/2003 | Bushnell |
| 6,535,601 B1 | 3/2003 | Flockhart et al. |
| 6,570,980 B1 | 5/2003 | Baruch |
| 6,587,556 B1 | 7/2003 | Judkins et al. |
| 6,603,854 B1 | 8/2003 | Judkins et al. |
| 6,639,976 B1 | 10/2003 | Shellum et al. |
| 6,661,889 B1 | 12/2003 | Flockhart et al. |
| 6,704,410 B1 | 3/2004 | McFarlane et al. |
| 6,707,904 B1 | 3/2004 | Judkins et al. |
| 6,714,643 B1 | 3/2004 | Gargeya et al. |
| 6,763,104 B1 | 7/2004 | Judkins et al. |
| 6,774,932 B1 | 8/2004 | Ewing et al. |
| 6,775,378 B1 | 8/2004 | Villena et al. |
| 6,798,876 B1 | 9/2004 | Bala |
| 6,829,348 B1 | 12/2004 | Schroeder et al. |
| 6,832,203 B1 | 12/2004 | Villena et al. |
| 6,859,529 B2 | 2/2005 | Duncan et al. |
| 6,922,466 B1 | 7/2005 | Peterson et al. |
| 6,937,715 B2 | 8/2005 | Delaney |
| 6,956,941 B1 | 10/2005 | Duncan et al. |
| 6,970,821 B1 | 11/2005 | Shambaugh et al. |
| 6,978,006 B1 | 12/2005 | Polcyn |
| 7,023,979 B1 | 4/2006 | Wu et al. |
| 7,039,166 B1 | 5/2006 | Peterson et al. |
| 7,050,566 B2 | 5/2006 | Becerra et al. |
| 7,050,567 B1 | 5/2006 | Jensen |
| 7,062,031 B2 | 6/2006 | Becerra et al. |
| 7,068,775 B1 | 6/2006 | Lee |
| 7,092,509 B1 | 8/2006 | Mears et al. |
| 7,103,172 B2 | 9/2006 | Brown et al. |
| 7,158,628 B2 | 1/2007 | McConnell et al. |
| 7,184,540 B2 | 2/2007 | Dezonno et al. |
| 7,209,549 B2 | 4/2007 | Reynolds et al. |
| 7,231,032 B2 | 6/2007 | Nevman et al. |
| 7,231,034 B1 | 6/2007 | Rikhy et al. |
| 7,236,584 B2 | 6/2007 | Torba |
| 7,245,716 B2 | 7/2007 | Brown et al. |
| 7,245,719 B2 | 7/2007 | Kawada et al. |
| 7,266,251 B2 | 9/2007 | Rowe |
| 7,269,253 B1 | 9/2007 | Wu et al. |
| 7,353,388 B1 | 4/2008 | Gilman et al. |
| 7,398,224 B2 | 7/2008 | Cooper |
| 7,593,521 B2 | 9/2009 | Becerra et al. |
| 7,676,034 B1 | 3/2010 | Wu et al. |
| 7,725,339 B1 | 5/2010 | Aykin |
| 7,734,032 B1 | 6/2010 | Kiefhaber et al. |
| 7,798,876 B2 | 9/2010 | Mix |
| 7,826,597 B2 | 11/2010 | Berner et al. |
| 7,864,944 B2 | 1/2011 | Khouri et al. |
| 7,899,177 B1 | 3/2011 | Bruening et al. |
| 7,916,858 B1 | 3/2011 | Heller et al. |
| 7,940,917 B2 | 5/2011 | Lauridsen et al. |
| 7,961,866 B1 | 6/2011 | Boutcher et al. |
| 7,995,717 B2 | 8/2011 | Conway et al. |
| 8,000,989 B1 | 8/2011 | Kiefhaber et al. |
| 8,010,607 B2 | 8/2011 | McCormack et al. |
| 8,094,790 B2 | 1/2012 | Conway et al. |
| 8,126,133 B1 | 2/2012 | Everingham et al. |
| 8,140,441 B2 | 3/2012 | Cases et al. |
| 8,175,253 B2 | 5/2012 | Knott et al. |
| 8,229,102 B2 | 7/2012 | Knott et al. |
| 8,249,245 B2 | 8/2012 | Jay et al. |
| 8,295,471 B2 | 10/2012 | Spottiswoode et al. |
| 8,300,798 B1 | 10/2012 | Wu et al. |
| 8,359,219 B2 | 1/2013 | Chishti et al. |
| 8,433,597 B2 | 4/2013 | Chishti et al. |
| 8,472,611 B2 | 6/2013 | Chishti |
| 8,565,410 B2 | 10/2013 | Chishti et al. |
| 8,634,542 B2 | 1/2014 | Spottiswoode et al. |
| 8,644,490 B2 | 2/2014 | Stewart |
| 8,670,548 B2 | 3/2014 | Xie et al. |
| 8,699,694 B2 | 4/2014 | Chishti et al. |
| 8,712,821 B2 | 4/2014 | Spottiswoode |
| 8,718,271 B2 | 5/2014 | Spottiswoode |
| 8,724,797 B2 | 5/2014 | Chishti et al. |
| 8,731,178 B2 | 5/2014 | Chishti et al. |
| 8,737,595 B2 | 5/2014 | Chishti et al. |
| 8,750,488 B2 | 6/2014 | Spottiswoode et al. |
| 8,781,100 B2 | 7/2014 | Spottiswoode et al. |
| 8,781,106 B2 | 7/2014 | Afzal |
| 8,792,630 B2 | 7/2014 | Chishti et al. |
| 8,824,658 B2 | 9/2014 | Chishti |
| 8,879,715 B2 | 11/2014 | Spottiswoode et al. |
| 8,903,079 B2 | 12/2014 | Xie et al. |
| 8,929,537 B2 | 1/2015 | Chishti et al. |
| 8,995,647 B2 | 3/2015 | Li et al. |
| 9,020,137 B2 | 4/2015 | Chishti et al. |
| 9,025,757 B2 | 5/2015 | Spottiswoode et al. |
| 9,215,323 B2 | 12/2015 | Chishti |
| 9,277,055 B2 | 3/2016 | Spottiswoode et al. |
| 9,300,802 B1 | 3/2016 | Chishti |
| 9,426,296 B2 | 8/2016 | Chishti et al. |
| 9,712,676 B1 | 7/2017 | Chishti |
| 9,712,679 B2 | 7/2017 | Chishti et al. |
| 2001/0032120 A1 | 10/2001 | Stuart et al. |
| 2002/0018554 A1 | 2/2002 | Jensen et al. |
| 2002/0046030 A1 | 4/2002 | Haritsa et al. |
| 2002/0059164 A1 | 5/2002 | Shtivelman |
| 2002/0082736 A1 | 6/2002 | Lech et al. |
| 2002/0110234 A1 | 8/2002 | Walker et al. |
| 2002/0111172 A1 | 8/2002 | DeWolf et al. |
| 2002/0131399 A1 | 9/2002 | Philonenko |
| 2002/0138285 A1 | 9/2002 | DeCotiis et al. |
| 2002/0143599 A1 | 10/2002 | Nourbakhsh et al. |
| 2002/0161765 A1 | 10/2002 | Kundrot et al. |
| 2002/0184069 A1 | 12/2002 | Kosiba et al. |
| 2002/0196845 A1 | 12/2002 | Richards et al. |
| 2003/0002653 A1 | 1/2003 | Uckun |
| 2003/0081757 A1 | 5/2003 | Mengshoel et al. |
| 2003/0095652 A1 | 5/2003 | Mengshoel et al. |
| 2003/0169870 A1 | 9/2003 | Stanford |
| 2003/0174830 A1 | 9/2003 | Boyer et al. |
| 2003/0217016 A1 | 11/2003 | Pericle |
| 2004/0028211 A1 | 2/2004 | Culp et al. |
| 2004/0057416 A1 | 3/2004 | McCormack |
| 2004/0096050 A1 | 5/2004 | Das et al. |
| 2004/0098274 A1 | 5/2004 | Dezonno et al. |
| 2004/0101127 A1 | 5/2004 | Dezonno et al. |
| 2004/0109555 A1 | 6/2004 | Williams |
| 2004/0133434 A1 | 7/2004 | Szlam et al. |
| 2004/0210475 A1 | 10/2004 | Starnes et al. |
| 2004/0230438 A1 | 11/2004 | Pasquale et al. |
| 2004/0267816 A1 | 12/2004 | Russek |
| 2005/0013428 A1 | 1/2005 | Walters |
| 2005/0043986 A1 | 2/2005 | McConnell et al. |
| 2005/0047581 A1 | 3/2005 | Shaffer et al. |
| 2005/0047582 A1 | 3/2005 | Shaffer et al. |
| 2005/0071223 A1 | 3/2005 | Jain et al. |
| 2005/0129212 A1 | 6/2005 | Parker |
| 2005/0135593 A1 | 6/2005 | Becerra et al. |
| 2005/0135596 A1 | 6/2005 | Zhao |
| 2005/0187802 A1 | 8/2005 | Koeppel |
| 2005/0195960 A1 | 9/2005 | Shaffer et al. |
| 2005/0286709 A1 | 12/2005 | Horton et al. |
| 2006/0098803 A1 | 5/2006 | Bushey et al. |
| 2006/0110052 A1 | 5/2006 | Finlayson |
| 2006/0124113 A1 | 6/2006 | Roberts |
| 2006/0184040 A1 | 8/2006 | Keller et al. |
| 2006/0222164 A1 | 10/2006 | Contractor et al. |
| 2006/0233346 A1 | 10/2006 | McIlwaine et al. |
| 2006/0262918 A1 | 11/2006 | Karnalkar et al. |
| 2006/0262922 A1 | 11/2006 | Margulies et al. |

(56) References Cited

U.S. PATENT DOCUMENTS

| | | |
|---|---|---|
| 2007/0036323 A1 | 2/2007 | Travis |
| 2007/0071222 A1 | 3/2007 | Flockhart et al. |
| 2007/0121602 A1 | 5/2007 | Sin et al. |
| 2007/0121829 A1 | 5/2007 | Tal et al. |
| 2007/0136342 A1 | 6/2007 | Singhai et al. |
| 2007/0154007 A1 | 7/2007 | Bernhard |
| 2007/0174111 A1 | 7/2007 | Anderson et al. |
| 2007/0198322 A1 | 8/2007 | Bourne et al. |
| 2007/0219816 A1 | 9/2007 | Van Luchene et al. |
| 2007/0274502 A1 | 11/2007 | Brown |
| 2008/0002823 A1 | 1/2008 | Fama et al. |
| 2008/0008309 A1 | 1/2008 | Dezonno et al. |
| 2008/0046386 A1 | 2/2008 | Pieraccinii et al. |
| 2008/0065476 A1 | 3/2008 | Klein et al. |
| 2008/0118052 A1 | 5/2008 | Houmaidi et al. |
| 2008/0152122 A1 | 6/2008 | Idan et al. |
| 2008/0181389 A1 | 7/2008 | Bourne et al. |
| 2008/0199000 A1 | 8/2008 | Su et al. |
| 2008/0267386 A1 | 10/2008 | Cooper |
| 2008/0273687 A1 | 11/2008 | Knott et al. |
| 2009/0043670 A1 | 2/2009 | Johansson et al. |
| 2009/0086933 A1 | 4/2009 | Patel et al. |
| 2009/0190740 A1 | 7/2009 | Chishti et al. |
| 2009/0190743 A1 | 7/2009 | Spottiswoode |
| 2009/0190744 A1 | 7/2009 | Xie et al. |
| 2009/0190745 A1 | 7/2009 | Xie et al. |
| 2009/0190746 A1 | 7/2009 | Chishti et al. |
| 2009/0190747 A1 | 7/2009 | Spottiswoode |
| 2009/0190748 A1 | 7/2009 | Chishti et al. |
| 2009/0190749 A1 | 7/2009 | Xie et al. |
| 2009/0190750 A1 | 7/2009 | Xie et al. |
| 2009/0232294 A1 | 9/2009 | Xie et al. |
| 2009/0234710 A1 | 9/2009 | Belgaied Hassine et al. |
| 2009/0245493 A1 | 10/2009 | Chen et al. |
| 2009/0304172 A1 | 12/2009 | Becerra et al. |
| 2009/0318111 A1 | 12/2009 | Desai et al. |
| 2009/0323921 A1 | 12/2009 | Spottiswoode et al. |
| 2010/0020959 A1 | 1/2010 | Spottiswoode |
| 2010/0020961 A1 | 1/2010 | Spottiswoode |
| 2010/0054431 A1 | 3/2010 | Jaiswal et al. |
| 2010/0054452 A1* | 3/2010 | Afzal ................. H04M 3/5232 379/265.11 |
| 2010/0054453 A1 | 3/2010 | Stewart |
| 2010/0086120 A1 | 4/2010 | Brussat et al. |
| 2010/0111285 A1 | 5/2010 | Chishti |
| 2010/0111286 A1 | 5/2010 | Chishti |
| 2010/0111287 A1 | 5/2010 | Xie et al. |
| 2010/0111288 A1 | 5/2010 | Afzal et al. |
| 2010/0142698 A1 | 6/2010 | Spottiswoode et al. |
| 2010/0183138 A1 | 7/2010 | Spottiswoode et al. |
| 2011/0022357 A1 | 1/2011 | Vock et al. |
| 2011/0031112 A1 | 2/2011 | Birang et al. |
| 2011/0066481 A1* | 3/2011 | Vazacopoulos ........ G06Q 10/04 705/14.13 |
| 2011/0069821 A1 | 3/2011 | Korolev et al. |
| 2011/0125048 A1 | 5/2011 | Causevic et al. |
| 2012/0051536 A1 | 3/2012 | Chishti et al. |
| 2012/0051537 A1 | 3/2012 | Chishti et al. |
| 2012/0224680 A1 | 9/2012 | Spottiswoode et al. |
| 2012/0278136 A1 | 11/2012 | Flockhart et al. |
| 2013/0003959 A1 | 1/2013 | Nishikawa et al. |
| 2013/0251137 A1 | 9/2013 | Chishti et al. |
| 2014/0044246 A1 | 2/2014 | Klemm et al. |
| 2014/0079210 A1 | 3/2014 | Kohler et al. |
| 2014/0119531 A1 | 5/2014 | Tuchman et al. |
| 2014/0341370 A1 | 11/2014 | Li et al. |
| 2015/0055772 A1 | 2/2015 | Klemm et al. |
| 2016/0080573 A1 | 3/2016 | Chishti |
| 2017/0308909 A1* | 10/2017 | Faith .................. G06Q 30/0201 |
| 2018/0052933 A1* | 2/2018 | Verma ............... G06F 17/30867 |

FOREIGN PATENT DOCUMENTS

| | | |
|---|---|---|
| AU | 2009311534 B2 | 8/2014 |
| CN | 102301688 B | 5/2014 |
| CN | 102017591 B | 11/2014 |
| EP | 0 493 292 A2 | 7/1992 |
| EP | 0 949 793 A1 | 10/1999 |
| EP | 1 032 188 A1 | 8/2000 |
| EP | 1335572 A2 | 8/2003 |
| JP | 11-098252 A | 4/1999 |
| JP | 2000-078291 A | 3/2000 |
| JP | 2000-078292 A | 3/2000 |
| JP | 2000-092213 A | 3/2000 |
| JP | 2000-236393 A | 8/2000 |
| JP | 2001-292236 A | 10/2001 |
| JP | 2001-518753 A | 10/2001 |
| JP | 2002-297900 A | 10/2002 |
| JP | 3366565 B2 | 1/2003 |
| JP | 2003-187061 A | 7/2003 |
| JP | 2004-056517 A | 2/2004 |
| JP | 2004-227228 A | 8/2004 |
| JP | 2006-345132 A | 12/2006 |
| JP | 2007-324708 A | 12/2007 |
| JP | 2011-511533 A | 4/2011 |
| JP | 2011-511536 A | 4/2011 |
| JP | 5421928 B2 | 2/2014 |
| JP | 5631326 B2 | 11/2014 |
| JP | 5649575 B2 | 1/2015 |
| MX | 316118 | 12/2013 |
| MX | 322251 | 7/2014 |
| NZ | 587100 B | 10/2013 |
| NZ | 587101 B | 10/2013 |
| NZ | 591486 B | 1/2014 |
| NZ | 592781 B | 3/2014 |
| PH | 1-2010-501704 | 2/2014 |
| PH | 1-2010-501705 | 2/2015 |
| WO | WO-1999/017517 A1 | 4/1999 |
| WO | WO-2001/063894 A2 | 8/2001 |
| WO | WO-2006/124113 A2 | 11/2006 |
| WO | WO-2010/053701 A2 | 5/2010 |
| WO | WO-2011/081514 A1 | 7/2011 |

OTHER PUBLICATIONS

Canadian Office Action issued in Canadian Patent Application No. 2713526, dated Oct. 25, 2016, 7 pages.

Chen, G., et al., "Enhanced Locality Sensitive Clustering High Dimensional Space," Transactions on Electrical and Electronic Materials, vol. 15, No. 3, pp. 125-129 (Jun. 25, 2004).

Cleveland, William S., "Robust Locally Weighted Regression and Smoothing Scatterplots," Journal of the American Statistical Association, vol. 74, No. 368, pp. 829-836 (Dec. 1979).

Extended European Search Report issued by the European Patent Office for European Application No. 17154781.3 dated May 4, 2017 (7 pages).

Gans, N. et al. (2003), "Telephone Call Centers: Tutorial, Review and Research Prospects," Manufacturing & Service Operations Management, vol. 5, No. 2, pp. 79-141, 84 pages.

International Preliminary Report on Patentability issued in connection with PCT Application No. PCT/US2009/066254 dated Jun. 14, 2011 (6 pages).

International Search Report and Written Opinion issued by the European Patent Office as International Searching Authority for International Application No. PCT/IB2016/001762 dated Feb. 20, 2017 (15 pages).

International Search Report and Written Opinion issued by the European Patent Office as International Searching Authority for International Application No. PCT/IB2016/001776 dated Mar. 3, 2017 (16 pages).

International Search Report and Written Opinion issued by the European Patent Office as International Searching Authority for International Application No. PCT/IB2017/000570 dated Jun. 30, 2017 (13 pages).

International Search Report issued in connection with International Application No. PCT/US13/33268 dated May 31, 2013 (2 pages).

(56) References Cited

OTHER PUBLICATIONS

International Search Report issued in connection with PCT Application No. PCT/US/2009/054352 dated Mar. 12, 2010, 5 pages.
International Search Report issued in connection with PCT Application No. PCT/US2008/077042 dated Mar. 13, 2009 (3 pages).
International Search Report issued in connection with PCT Application No. PCT/US2009/031611 dated Jun. 3, 2009 (5 pages).
International Search Report issued in connection with PCT Application No. PCT/US2009/066254 dated Feb. 24, 2010 (4 pages).
International Search Report issued in connection with PCT/US2009/061537 dated Jun. 7, 2010 (5 pages).
International Search Report issued in connection with PCT/US2013/033261 dated Jun. 14, 2013 (3 pages).
International Search Report issued in connection with PCT/US2013/33265 dated Jul. 9, 2013 (2 pages).
Japanese Office Action issued by the Japan Patent Office for Application No. 2015-503396 dated Jun. 29, 2016 (7 pages).
Koole, G. (2004). "Performance Analysis and Optimization in Customer Contact Centers," Proceedings of the Quantitative Evaluation of Systems, First International Conference, Sep. 27-30, 2004 (4 pages).
Koole, G. et al. (Mar. 6, 2006). "An Overview of Routing and Staffing Algorithms in Multi-Skill Customer Contact Centers," Manuscript, 42 pages.
Ntzoufras, "Bayesian Modeling Using Winbugs". Wiley Interscience, Chapter 5, Normal Regression Models, Oct. 18, 2007, pp. 155-220 (67 pages).
Press, W. H. and Rybicki, G. B., "Fast Algorithm for Spectral Analysis of Unevenly Sampled Data," The Astrophysical Journal, vol. 338, pp. 277-280 (Mar. 1, 1989).
Riedmiller, M. et al. (1993). "A Direct Adaptive Method for Faster Back Propagation Learning: The RPROP Algorithm," 1993 IEEE International Conference on Neural Networks, San Francisco, CA, Mar. 28-Apr. 1, 1993, 1:586-591.
Stanley et al., "Improving call center operations using performance-based routing strategies," Calif. Journal of Operations Management, 6(1), 24-32, Feb. 2008; retrieved from http://userwww.sfsu.edu/saltzman/Publist.html.
Subsequent Substantive Examination Report issued in connection with Philippines Application No. 1-2010-501705 dated Jul. 14, 2014 (1 page).
Substantive Examination Report issued in connection with Philippines Application No. 1/2011/500868 dated May 2, 2014 (1 page).
Written Opinion of the International Searching Authority issued in connection with International Application No. PCT/US13/33268 dated May 31, 2013, 7 pages.
Written Opinion of the International Searching Authority issued in connection with PCT Application No. PCT/US/2009/054352 dated Mar. 12, 2010, 5 pages.
Written Opinion of the International Searching Authority issued in connection with PCT Application No. PCT/US2008/077042 dated Mar. 13, 2009, 6 pages.
Written Opinion of the International Searching Authority issued in connection with PCT Application No. PCT/US2009/031611 dated Jun. 3, 2009, 7 pages.
Written Opinion of the International Searching Authority issued in connection with PCT Application No. PCT/US2009/066254 dated Feb. 24, 2010, 5 pages.
Written Opinion of the International Searching Authority issued in connection with PCT/US2009/061537 dated Jun. 7, 2010, 10 pages.
Written Opinion of the International Searching Authority issued in connection with PCT/US2013/033261 dated Jun. 14, 2013, 7 pages.
Written Opinion of the International Searching Authority issued in connection with PCT/US2013/33265 dated Jul. 9, 2013, 7 pages.

* cited by examiner

TECHNIQUES FOR BEHAVIORAL PAIRING MODEL EVALUATION IN A CONTACT CENTER SYSTEM

FIELD OF THE DISCLOSURE

This disclosure generally relates to model evaluation for pairing contacts and agents in contact centers and, more particularly, to techniques for behavioral pairing model evaluation in a contact center system.

BACKGROUND OF THE DISCLOSURE

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In other typical contact centers, other strategies may be used, such as "performance-based routing", or a "PBR" strategy.

In other, more advanced contact centers, contacts are paired with agents using a "behavioral pairing", or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement because BP acts on the same calls and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SATMAP", "routing system", "routing engine", etc.) is described in, for example, U.S. Pat. No. 8,879,715, which is incorporated herein by reference.

A BP strategy may develop a model of contact types, for which expected performance gains over other pairing strategies may be determined. However, model generation and validation may be time-consuming and resource-intensive, or they may benefit from manual intervention or fine-tuning.

In view of the foregoing, it may be understood that there is a need for a system that enables improving behavioral pairing model selection to improve the efficiency and performance of pairing strategies that are designed to choose among multiple possible pairings.

SUMMARY OF THE DISCLOSURE

Techniques for behavioral pairing model evaluation in a contact center system are disclosed. In one particular embodiment, the techniques may be realized as a method for behavioral pairing model evaluation in a contact center system comprising determining, by at least one computer processor communicatively coupled to and configured to operate in the contact center system, contact data; partitioning, by the at least one computer processor, the contact data into a first plurality of types; determining, by the at least one computer processor, a first measure of the quality of the partitioning of the contact data into the first plurality of types; and outputting, by the at least one computer processor, a computer-processor generated behavioral pairing model based on the quality of the partitioning.

In accordance with other aspects of this particular embodiment, partitioning the contact data comprises applying, by the at least one computer processor, locality sensitive hashing (LSH) to the contact data.

In accordance with other aspects of this particular embodiment, the contact data may be divided into training contact data and test contact data.

In accordance with other aspects of this particular embodiment, partitioning the contact data comprises applying, by the at least one computer processor, a randomized set of partitions.

In accordance with other aspects of this particular embodiment, the method may further comprise partitioning, by the at least one computer processor, the contact data into a second plurality of types different from the first plurality of types; determining, by the at least one computer processor, a second measure of the quality of the partitioning of the contact data into the second plurality of types; and selecting, by the at least one computer processor, one of the first plurality of types and the second plurality of types having a higher measure of the quality of the partitioning by comparing the first and second measures of the quality of the partitioning, wherein the computer-processor generated behavioral pairing model may be based on the selected one of the first plurality of types and the second plurality of types.

In accordance with other aspects of this particular embodiment, the selected one of the first and second plurality of types is expected to provide a greater increase in expected contact center performance than the other of the first and second plurality of types.

In accordance with other aspects of this particular embodiment, the method may further comprise applying, by the at least one computer processor, the behavioral pairing model to at least one contact and at least one available agent within the contact center system using a behavioral pairing strategy.

In another particular embodiment, the techniques may be realized as a system for behavioral pairing model evaluation in a contact center system comprising at least one computer processor communicatively coupled to and configured to operate in the contact center system, wherein the at least one computer processor is configured to perform the steps in the above-discussed method.

In another particular embodiment, the techniques may be realized as an article of manufacture for behavioral pairing model evaluation in a contact center system comprising a non-transitory processor readable medium and instructions stored on the medium, wherein the instructions are configured to be readable from the medium by at least one computer processor communicatively coupled to and configured to operate in the contact center system and thereby cause the at least one computer processor to operate to perform the steps in the above-discussed method.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

To facilitate a fuller understanding of the present disclosure, reference is now made to the accompanying drawings, in which like elements are referenced with like numerals. These drawings should not be construed as limiting the present disclosure, but are intended to be illustrative only.

DETAILED DESCRIPTION

A typical contact center algorithmically assigns contacts arriving at the contact center to agents available to handle those contacts. At times, the contact center may have agents available and waiting for assignment to inbound or outbound contacts (e.g., telephone calls, Internet chat sessions, email). At other times, the contact center may have contacts waiting in one or more queues for an agent to become available for assignment.

In some typical contact centers, contacts are assigned to agents ordered based on time of arrival, and agents receive contacts ordered based on the time when those agents became available. This strategy may be referred to as a "first-in, first-out", "FIFO", or "round-robin" strategy. In other typical contact centers, other strategies may be used, such as "performance-based routing", or a "PBR" strategy.

In other, more advanced contact centers, contacts are paired with agents using a "behavioral pairing", or a "BP" strategy, under which contacts and agents may be deliberately (preferentially) paired in a fashion that enables the assignment of subsequent contact-agent pairs such that when the benefits of all the assignments under a BP strategy are totaled they may exceed those of FIFO and other strategies such as performance-based routing ("PBR") strategies. BP is designed to encourage balanced utilization of agents within a skill queue while nevertheless simultaneously improving overall contact center performance beyond what FIFO or PBR methods will allow. This is a remarkable achievement because BP acts on the same calls and same agents as FIFO or PBR methods, utilizes agents approximately evenly as FIFO provides, and yet improves overall contact center performance. BP is described in, e.g., U.S. Pat. No. 9,300,802, which is incorporated by reference herein. Additional information about these and other features regarding the pairing or matching modules (sometimes also referred to as "SATMAP", "routing system", "routing engine", etc.) is described in, for example, U.S. Pat. No. 8,879,715, which is incorporated herein by reference.

A BP strategy may develop a model of contact types, for which expected performance gains over other pairing strategies may be determined. However, model generation and validation may be time-consuming and resource-intensive, or they may benefit from manual intervention or fine-tuning.

In view of the foregoing, it may be understood that there is a need for a system that enables improving behavioral pairing model selection to improve the efficiency and performance of pairing strategies that are designed to choose among multiple possible pairings.

Figure 1:
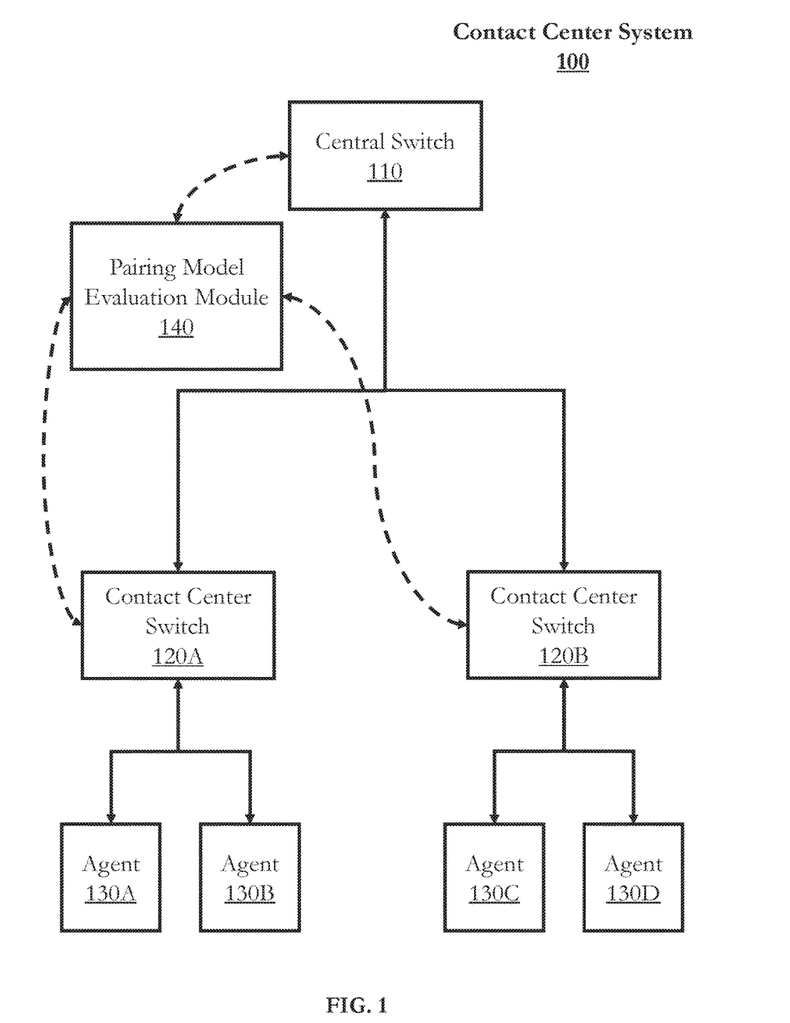
FIG. 1 shows a block diagram of a contact center according to embodiments of the present disclosure.

FIG. 1 shows a block diagram of a contact center system 100 according to embodiments of the present disclosure. The description herein describes network elements, computers, and/or components of a system and method for simulating contact center systems that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

As shown in FIG. 1, the contact center system 100 may include a central switch 110. The central switch 110 may receive incoming contacts (e.g., callers) or support outbound connections to contacts via a telecommunications network (not shown). The central switch 110 may include contact routing hardware and software for helping to route contacts among one or more contact centers, or to one or more PBX/ACDs or other queuing or switching components, including other Internet-based, cloud-based, or otherwise networked contact-agent hardware or software-based contact center solutions.

The central switch 110 may not be necessary such as if there is only one contact center, or if there is only one PBX/ACD routing component, in the contact center system 100. If more than one contact center is part of the contact center system 100, each contact center may include at least one contact center switch (e.g., contact center switches 120A and 120B). The contact center switches 120A and 120B may be communicatively coupled to the central switch 110. In embodiments, various topologies of routing and network components may be configured to implement the contact center system.

Each contact center switch for each contact center may be communicatively coupled to a plurality (or "pool") of agents. Each contact center switch may support a certain number of agents (or "seats") to be logged in at one time. At any given time, a logged-in agent may be available and waiting to be connected to a contact, or the logged-in agent may be unavailable for any of a number of reasons, such as being connected to another contact, performing certain post-call functions such as logging information about the call, or taking a break.

In the example of FIG. 1, the central switch 110 routes contacts to one of two contact centers via contact center switch 120A and contact center switch 120B, respectively. Each of the contact center switches 120A and 120B are shown with two agents each. Agents 130A and 130B may be logged into contact center switch 120A, and agents 130C and 130D may be logged into contact center switch 120B.

The contact center system 100 may also be communicatively coupled to an integrated service from, for example, a third-party vendor. In the example of FIG. 1, pairing model evaluation module 140 may be communicatively coupled to one or more switches in the switch system of the contact center system 100, such as central switch 110, contact center switch 120A, or contact center switch 120B. In some embodiments, switches of the contact center system 100 may be communicatively coupled to multiple pairing model evaluation modules (e.g., a BP model evaluation module). In some embodiments, pairing model evaluation module 140 may be embedded within a component of a contact center system (e.g., embedded in or otherwise integrated with a switch). The pairing model evaluation module 140 may receive information from a switch (e.g., contact center switch 120A) about agents logged into the switch (e.g., agents 130A and 130B) and about incoming contacts via another switch (e.g., central switch 110) or, in some embodiments, from a network (e.g., the Internet or a telecommunications network) (not shown).

A contact center may include multiple pairing modules (e.g., a BP module and a FIFO module) (not shown), and one or more pairing modules may be provided by one or more different vendors. In some embodiments, one or more pairing modules may be components of pairing model evaluation module 140 or one or more switches such as central switch 110 or contact center switches 120A and 120B. In some embodiments, a pairing model evaluation module may determine which pairing module may handle pairing for a particular contact. For example, the pairing model evaluation module may alternate between enabling pairing via the BP module and enabling pairing with the FIFO module. In other embodiments, one pairing module (e.g., the BP module) may be configured to emulate other pairing strategies. For example, a pairing model evaluation module, or a pairing model evaluation component integrated with BP components in the BP module, may determine whether the BP module may use BP pairing or emulated FIFO pairing for a particular contact. In this case, "BP on" may refer to times when the BP module is applying the BP pairing strategy, and "BP off" may refer to other times when the BP module is applying a different pairing strategy (e.g., FIFO).

In some embodiments, regardless of whether pairing strategies are handled by separate modules, or if some pairing strategies are emulated within a single pairing module, the single pairing module may be configured to monitor and store information about pairings made under any or all pairing strategies. For example, a BP module may observe and record data about FIFO pairings made by a FIFO module, or the BP module may observe and record data about emulated FIFO pairings made by a BP module operating in FIFO emulation mode.

Figure 2A:
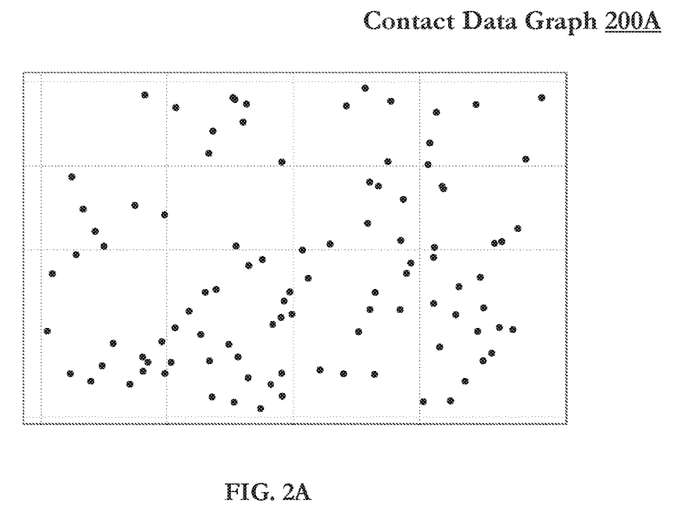
FIG. 2A depicts an example of contact data according to embodiments of the present disclosure.

FIG. 2A depicts an example of contact data according to embodiments of the present disclosure. In the example of FIG. 2A, each point plotted on the contact data graph 200A represents a contact or, in some embodiments, historical contact outcome data. For simplicity, the example shows the contacts in a two-dimensional space. The dimensions "x" and "y" may represent a variety of different variables or other properties associated with a contact or a historical contact interaction outcome. For example, "x" may represent an expected likelihood that a contact will purchase a particular product or service from a contact center's agent in a sales queue, and "y" may represent an expected duration of a contact interaction (e.g., an expected handle time for a call).

In the example of FIG. 2A, "x" and "y" are continuous variables, scaled or otherwise normalized within the range (−10.0, 10.0). In this simplified, hypothetical example, a positive "x" value may represent a contact that is more likely than not to make a purchase, whereas a negative "x" value may represent a contact that has a less than 50% likelihood of making a purchase. Similarly, a positive "y" value may represent a contact expected to have a relatively "long" interaction (duration above a certain threshold number of minutes or seconds), whereas a negative "y" value may represent a contact expected to have a relatively "short" interaction (duration below the threshold number of minutes or seconds).

In some embodiments, more than two dimensions may be represented in higher n-dimensional space (or "hyperspace"), such as three-dimensional, four-dimensional, or higher. Each contact (or contact interaction outcome) may be represented by an n-dimensional point (x, y, z, . . . , n). In this simplified example, two-dimensional space is used to make the system easier to visualize for the purpose of the present disclosure; however, the system may function in the same way for more complex, higher-dimensional datasets.

Figure 2B:
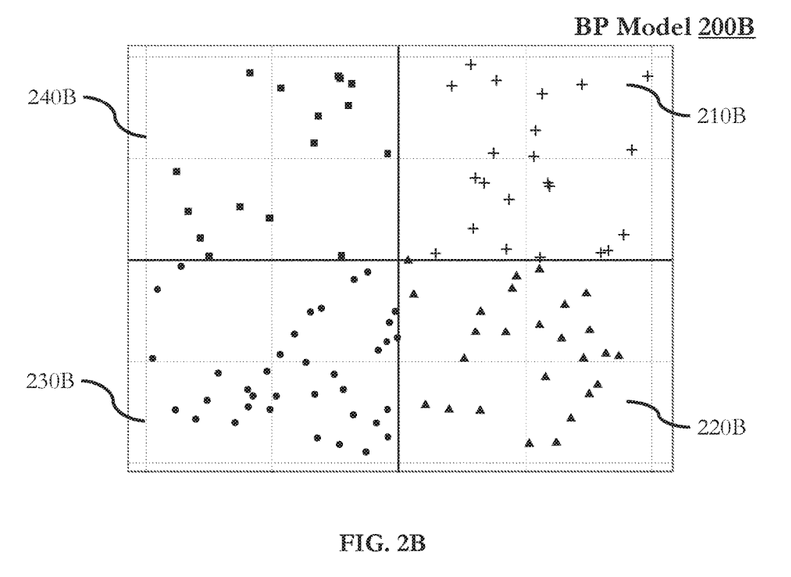
FIG. 2B shows an example of a behavioral pairing model according to embodiments of the present disclosure.

FIG. 2B shows an example of a behavioral pairing model 200B according to embodiments of the present disclosure. Under a BP strategy, contacts may be paired with agents based on information about the contacts in queue and the available agents that is known or inferred by the system. In some embodiments, a BP strategy may group (or "segment" or "cluster") individual contacts as they arrive at the contact center system, according to rules or predicates derived from the BP model.

In the example of FIG. 2B, contacts may be segmented into one of four contact types, as shown in the BP model 200B in quadrants 210B, 220B, 230B, and 240B. Quadrant 210B (positive x; positive y) includes contacts expected to take a relatively long time and buy a product. Quadrant 220B (positive x; negative y) includes contacts expected to take a relatively short time and buy a product. Quadrant 230B (negative x; negative y) includes contacts expected to take a relatively short time and not buy a product. Quadrant 240B (negative x; positive y) includes contacts expected to take a relatively long time and not buy a product.

In some situations, a contact may have an apparently neutral value in one or more dimensions (i.e., x equals 0, y equals 0, or both x and y equal 0). In some embodiments, a BP model may arbitrarily assign these contacts to a cluster or type on one side or the other of the "dividing line" (or dividing plane in 3D space or hyperplane in hyperspace). For example, BP model 200B may determine that contacts have a 50% likelihood to buy something (just as likely as not, or neutral) may be grouped with contacts having a positive x value (more likely than not to buy something), or the BP model 200B may determine that these contacts may be grouped with contacts having a negative x value (more likely to not buy anything). In other embodiments, a BP pairing module may randomly assign a neutral contact along one or more dimensions to either side of the dividing line, plane, hyperplane, etc.

In the simplified example of FIG. 2B, only two dividing lines are shown, which segment contacts into one of four contact types (2 dimensions raised to the power of 2 dividing lines). In another example, three, four, or more (i.e., "m") dividing lines may be used, dividing contacts into 8, 16, ..., $2^m$ contact types. Similarly, in three-dimensional space with only two dividing planes, contacts may be segmented into one of four contact types, and n-dimensional hyperspace may be divided by m hyperplanes into $2^m$ contact types. In this example, all dividing lines intersect the origin at (0, 0), or (0, 0, ..., 0) for hyperplanes intersecting the origin in higher-dimensional space. In other examples, some or all dividing lines or hyperplanes may intersect at other points. In this example, all regions are divided by straight lines (or flat hyperplanes). In other examples, regions may be divided by nonlinear curves or curved hyperplanes.

This type of contact segmentation may include techniques relating to locality sensitive hashing ("LSH"), also known as locality sensitive clustering. More information about LSH may be found in, for example, Chen et al., "Enhanced Locality Sensitive Clustering in High Dimensional Space," TRANS. ON ELEC. AND ELECTRONIC MATERIALS, Vol. 15, No. 3, pp. 125-29 (Jun. 25, 2014), hereby incorporated by reference in its entirety.

The process may be similar to a "nearest neighbor" process, by which contacts that are similar to one another (e.g., separated by relatively small distances in n-dimensional space) may be assumed to have similar behavior suitable for a BP strategy. One distinction between LSH and nearest-neighbor grouping is that a given dividing line/hyperplane may separate two contacts into different groups even if they would have otherwise been considered nearest neighbors and therefore would otherwise have been expected to behave in a similar manner to one another. In practice, an inefficiency that may arise due to separating neighboring contacts into separate clusters may be offset by the overall performance gain for the contact center system as a whole due to relatively efficient overall clustering of most of the contacts entering the contact center system.

Figure 3A:
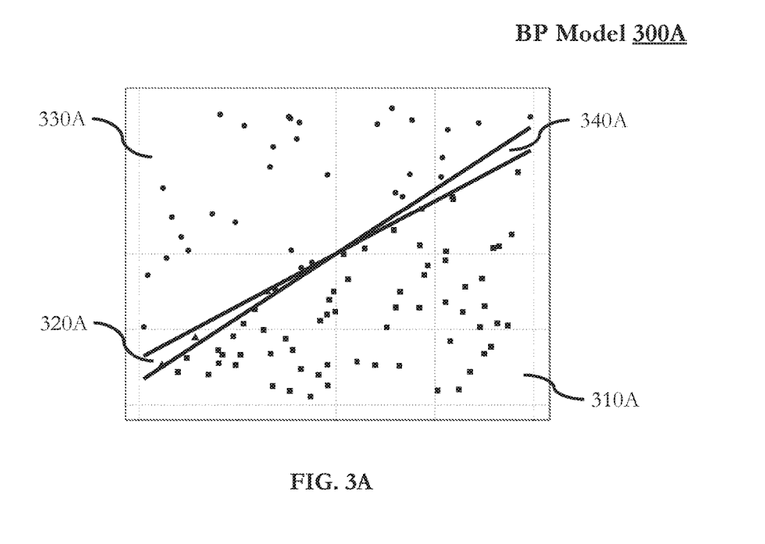
FIG. 3A shows an example of a behavioral pairing model according to embodiments of the present disclosure.

The performance of a particular LSH-based BP model may depend on the quality of the fit to available contact data (e.g., customer relationship management or CRM data) and historical contact outcome data. FIG. 3A shows an example of a behavioral pairing model 300A according to embodiments of the present disclosure. In the example of FIG. 3A, two dividing lines are used to segment 2D contact data into four clusters 310A, 320A, 330A, and 340A. Cluster 310A contains the most contacts, followed by cluster 330A which also contains many contacts. Cluster 320A contains only a small handful of contacts, and cluster 340A does not contain any contacts at all. Thus, BP model 300A may have relatively poor performance compared to other possible divisions.

Figure 3B:
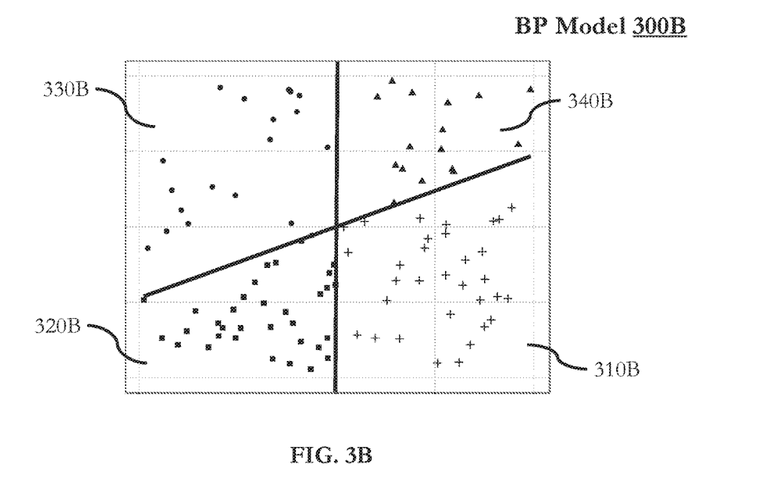
FIG. 3B shows an example of a behavioral pairing model according to embodiments of the present disclosure.

FIG. 3B shows an example of a BP model 300B according to embodiments of the present disclosure. In the example of FIG. 3B, two dividing lines are used to segment 2D contact data into four clusters 310B, 320B, 330B, and 340B. In contrast to BP model 300A, the contact data in BP model 300B is segmented into relatively more uniform clusters 310B-340B. Thus, BP model 300B may have relatively better predictability power for future contacts with similar features as those defined by the clusters 310B-340B. Better predictability power may lead, in turn, to relatively higher performance compared to other possible divisions such as BP model 300A.

In some embodiments, a technique for selecting dividing lines may be to choose lines manually that appear to segment the contact data in meaningfully or statistically useful ways. For example, the segmentation of the data in BP model 200B (FIG. 2B)—which used dividing lines along the two axes (x=0 and y=0)—may appear to offer a relatively good segmentation of the contact data shown in BP model 200B. However, a relatively simple division such as dividing along the axes in 2D or higher-dimensional space may not also offer an optimal or even a preferred solution, given the contact data found in the model.

In other embodiments, a technique for selecting dividing lines may be to search algorithmically for a statistically optimal segmentation. Depending on the techniques used, such as finely-tuned decision trees or hierarchical clustering greedy algorithm may lead to high accuracy but may also be time consuming and/or computationally resource intensive, especially as the number of dimensions and the amount of contact data increase.

Figure 4:
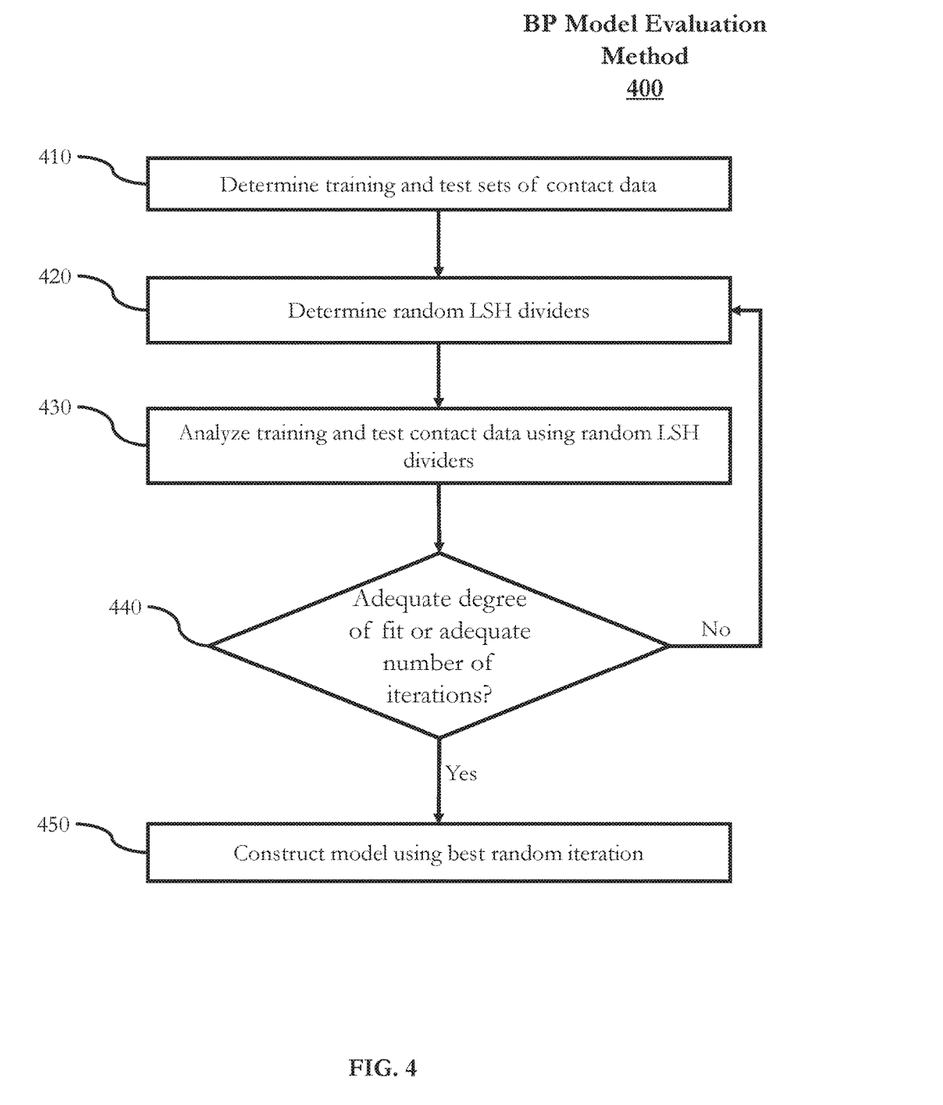
FIG. 4 shows a flow diagram of a BP model evaluation method according to embodiments of the present disclosure.

In other embodiments, LSH with randomized trials may offer a preferred balance between good-to-high accuracy while remaining relatively computationally fast. FIG. 4 shows a flow diagram of a BP model evaluation method 400 according to embodiments of the present disclosure that use LSH with randomized trials. BP model evaluation method may begin at block 410.

At block 410, training and test sets of contact data may be determined. For example, contact data may include customer relationship management (CRM) data, demographic data, psychographic data, or other data sources about contacts. In some embodiments, historical contact interaction outcome data may also be used. For example, a range of data such as a one week, one month, one year, etc. may include information about which contacts interacted with which agents, when, for how long, what the outcome was, and more. Any contact data available may be divided into training and test data subsets. For example, a training subset of data may be used when considering randomized trials of LSH dividers, and test data subsets may be subsequently used to validate the BP model including the preferred set of LSH dividers. After determining contact data, including training and test sets of contact data, BP model evaluation method may proceed to block 420.

At block 420, random LSH dividers may be determined. In some embodiments, each random trial may be conducted serially, such as on a single thread or core. In other embodiments, multiple random trials may be conducted in parallel across multiple threads or processor cores. In some embodiments, LSH dividers may be assumed to intersect through the origin. In the case of two-dimensional space, LSH dividers may be lines of the form $Ax+By=0$, wherein the coefficients A and B may be set at random. In some embodiments, a random trial will ensure that each random set of coefficients is unique so that each divider is distinct from the others within a single trial. In some embodiments, the number of LSH dividers may be predetermined to a certain number of dividers such as one, two, three, or more dividers. The number of dividers/clusters may be scaled proportionally according to the size of the dataset and/or the variability of data within the dataset. After determining a set of random LSH dividers for a trial, BP model evaluation method 400 may proceed to block 430.

At block 430, the random LSH dividers may be applied to the training data (and, in some embodiments, test data) to analyze the contact data. For example, individual points of contact data may be segmented into one of the clusters defined by the boundaries of the LSH dividers. For example, in 2D space, all points lying "above" a given divider line may be assigned a "1" for that line, and points lying "below" the given divider line may be assigned a "0" for that line. If a point falls on the line itself, the point may be designated as part of the region above or below the divider line in any of a number of suitable ways (e.g., always considered above, always considered below, randomly assigned above or below). The particular technique of assigning a "1" or "0" for each divider line according to some embodiments enables a binary representation for each cluster, using a bitstring in which the i-th bit represents the position of the cluster or contact point with respect to the i-th divider line. After analyzing the training or test contact data according to the random trial of LSH dividers, BP model evaluation method may proceed to block 440.

At block 440, BP model evaluation method 400 may check for an adequate degree of fit in some embodiments, and/or an adequate number of iterations in some embodiments. For example, in some embodiments, the quality of the random trial may be measured or otherwise estimated by calculating a weighted average of the product of the standard deviations of contact data's x, y, . . . , n positions over the clusters defined by the random trial. In other embodiments, other heuristics or measurements may be used to assess the quality of the random trial.

In some embodiments, if the quality of the random trial exceeds a threshold degree of adequate fit, BP model evaluation method 400 may proceed to block 450 using the current random trial, which is the first random trial identified to have a sufficient/adequate degree of fit.

In other embodiments, BP model evaluation method 400 may return to block 420 to run additional random trials until a predetermined number of random trials (iterations) have been tested. In some embodiments, BP model evaluation method 400 may run for the predetermined number of iterations regardless of the degree of fit measured for any individual trial. After an adequate number of trials have run, BP model evaluation method 400 may proceed to block 450 using the random trial that provided the highest/best degree of fit.

At block 450, the selected trial of random LSH dividers may be used to construct a BP model. In some embodiments, the constructed BP model may be validated further using test data (not shown), such as test data subsets determined at block 410. After the BP model has been constructed or validated, BP model evaluation method 400 may end.

In some embodiments, a graphical or command line user interface may be provided to configure, setup, or control the BP model evaluation method 400. For example, controls may be provided to select the contact data (e.g., database), select the date range of data to use, select the percentage of data to use for training for test sets, select the number of randomized trials or iterations to test, select the number of LSH dividers to define in each trial, etc.

In some embodiments, a graphical or tabular user interface may be provided to display the results of the BP model evaluation method 400. For example, the interface may display information about the data being applied; the quality of the LSH trials (e.g., the "lift" or performance improvement that the model is expected to provide to the contact center system); a visualization or 2D projection of the size and type of LSH clusters defined in the best trial, and a list of IF/THEN/ELSE, predicates, or other formulae for defining or applying the LSH dividers/clusters to contact data in script or other computer program code.

The constructed BP model may be loaded or otherwise applied to a BP module operating within the contact center system. For example, if a contact (e.g., caller) arrives in a contact center system (e.g., call center), the BP module may determine data about the contact/caller, apply the BP model to the contact data to assign the contact to one of the clusters according to the LSH technique defined by the BP model. Subsequently, a BP strategy may be used to pair the contact of the assigned type/cluster to an available agent preferred according to a BP strategy. The paired contact and agent may then be connected for communication or other type of interaction within the contact center system.

At this point it should be noted that behavioral pairing model evaluation in a contact center system in accordance with the present disclosure as described above may involve the processing of input data and the generation of output data to some extent. This input data processing and output data generation may be implemented in hardware or software. For example, specific electronic components may be employed in a behavioral pairing model evaluation module or similar or related circuitry for implementing the functions associated with pairing model evaluation in a contact center system in accordance with the present disclosure as described above. Alternatively, one or more processors operating in accordance with instructions may implement the functions associated with BP in a contact center system in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for behavioral pairing model evaluation in a contact center system comprising:
    determining, by at least one computer processor communicatively coupled to and configured to operate in the contact center system, contact data;
    partitioning, by the at least one computer processor, the contact data into a first plurality of types;
    determining, by the at least one computer processor, a first measure of the quality of the partitioning of the contact data into the first plurality of types;
    partitioning, by the at least one computer processor, the contact data into a second plurality of types different from the first plurality of types;
    determining, by the at least one computer processor, a second measure of the quality of the partitioning of the contact data into the second plurality of types;
    selecting, by the at least one computer processor, one of the first plurality of types and the second plurality of types having a higher measure of the quality of the partitioning by comparing the first and second measures of the quality of the partitioning;

outputting, by the at least one computer processor, a computer-processor generated behavioral pairing model based on the quality of the partitioning, wherein the computer-processor generated behavioral pairing model is based on the selected one of the first plurality of types and the second plurality of types; and establishing, by the at least one computer processor, in a switch module of the contact center system, a communication channel between communication equipment of a contact and communication equipment of an agent based at least in part upon the computer-processor generated behavioral pairing model.

2. The method of claim 1, wherein partitioning the contact data comprises applying, by the at least one computer processor, locality sensitive hashing (LSH) to the contact data.

3. The method of claim 1, wherein the contact data is divided into training contact data and test contact data.

4. The method of claim 1, wherein partitioning the contact data comprises applying, by the at least one computer processor, a randomized set of partitions.

5. The method of claim 1, wherein the selected one of the first and second plurality of types is expected to provide a greater increase in expected contact center performance than the other of the first and second plurality of types.

6. The method of claim 1, further comprising:
applying, by the at least one computer processor, the behavioral pairing model to at least one contact and at least one available agent within the contact center system using a behavioral pairing strategy.

7. A system for behavioral pairing model evaluation in a contact center system comprising:
at least one computer processor communicatively coupled to and configured to operate in the contact center system, wherein the at least one computer processor is configured to:
determine contact data;
partition the contact data into a first plurality of types;
determine a first measure of the quality of the partitioning of the contact data into the first plurality of types;
partition the contact data into a second plurality of types different from the first plurality of types;
determine a second measure of the quality of the partitioning of the contact data into the second plurality of types;
select one of the first plurality of types and the second plurality of types having a higher measure of the quality of the partitioning by comparing the first and second measures of the quality of the partitioning;
output a computer-processor generated behavioral pairing model based on the quality of the partitioning, wherein the computer-processor generated behavioral pairing model is based on the selected one of the first plurality of types and the second plurality of types; and
establish, in a switch module of the contact center system, a communication channel between communication equipment of a contact and communication equipment of an agent based at least in part upon the computer-processor generated behavioral pairing model.

8. The system of claim 7, wherein partitioning the contact data comprises applying locality sensitive hashing (LSH) to the contact data.

9. The system of claim 7, wherein the contact data is divided into training contact data and test contact data.

10. The system of claim 7, wherein partitioning the contact data comprises applying a randomized set of partitions.

11. The system of claim 7, wherein the selected one of the first and second plurality of types is expected to provide a greater increase in expected contact center performance than the other of the first and second plurality of types.

12. The system of claim 7, wherein the at least one computer processor is further configured to:
apply the behavioral pairing model to at least one contact and at least one available agent within the contact center system using a behavioral pairing strategy.

13. An article of manufacture for behavioral pairing model evaluation in a contact center system comprising:
a non-transitory processor readable medium; and
instructions stored on the medium;
wherein the instructions are configured to be readable from the medium by at least one computer processor communicatively coupled to and configured to operate in the contact center system and thereby cause the at least one computer processor to operate so as to:
determine contact data;
partition the contact data into a first plurality of types;
determine a first measure of the quality of the partitioning of the contact data into the first plurality of types;
partition the contact data into a second plurality of types different from the first plurality of types;
determine a second measure of the quality of the partitioning of the contact data into the second plurality of types;
select one of the first plurality of types and the second plurality of types having a higher measure of the quality of the partitioning by comparing the first and second measures of the quality of the partitioning;
output a computer-processor generated behavioral pairing model based on the quality of the partitioning, wherein the computer-processor generated behavioral pairing model is based on the selected one of the first plurality of types and the second plurality of types; and
establish, in a switch module of the contact center system, a communication channel between communication equipment of a contact and communication equipment of an agent based at least in part upon the computer-processor generated behavioral pairing model.

14. The article of manufacture of claim 13, wherein partitioning the contact data comprises applying locality sensitive hashing (LSH) to the contact data.

15. The article of manufacture of claim 13, wherein the contact data is divided into training contact data and test contact data.

16. The article of manufacture of claim 13, wherein partitioning the contact data comprises applying a randomized set of partitions.

17. The article of manufacture of claim 13, wherein the selected one of the first and second plurality of types is expected to provide a greater increase in expected contact center performance than the other of the first and second plurality of types.

18. The article of manufacture of claim 13, wherein the at least one computer processor is further caused to operate so as to:

apply the behavioral pairing model to at least one contact and at least one available agent within the contact center system using a behavioral pairing strategy.

* * * * *